United States Patent [19]

Jang

[11] Patent Number: 5,078,178
[45] Date of Patent: Jan. 7, 1992

[54] FLOW CONTROL DEVICE

[76] Inventor: Yeong F. Jang, No. 70-4, Wan Tun Hsiang, Feng Shih Rd., Shih Kang Hsiang, Taichung Hsien, Taiwan

[21] Appl. No.: 701,499
[22] Filed: May 16, 1991
[51] Int. Cl.$^5$ ............................................. F16K 21/06
[52] U.S. Cl. ................................. 137/624.12; 251/15
[58] Field of Search ................... 137/624.12, 624.14, 137/499; 251/15, 20; 222/14, 20, 59; 239/68

[56] References Cited

U.S. PATENT DOCUMENTS

| | | | |
|---|---|---|---|
| 4,335,852 | 6/1982 | Chow | 137/624.12 X |
| 4,562,865 | 1/1986 | Lemkin | 137/624.12 |
| 4,846,222 | 7/1989 | Jang | 137/624.12 |

Primary Examiner—Alan Cohan
Attorney, Agent, or Firm—Dellett, Smith-Hill and Bedell

[57] ABSTRACT

A flow control device including a base, a ball caused to seal an opening of the base by water flow through the water inlet of the base, an impeller rotatably received in the base and can be propelled by water flow through the base, a plunger having a lower end contacting the ball, a gear frictionally engaged on an axle of a wheel and coupled to the impeller by a gearing so that the wheel can be caused to rotate by the impeller, the plunger can be caused to move up and down when the wheel rotates so that the ball can be caused to seal the opening of the base again.

4 Claims, 4 Drawing Sheets

FLOW CONTROL DEVICE

BACKGROUND OF THE INVENTION

1. Field of the Invention

The present invention relates to a control device, and more particularly to a flow control device.

2. Description of the Prior Art

The closest prior art of which the applicant is aware is his prior U.S. Pat. No. 4,846,222, filed Oct. 19, 1988, entitled "VOLUME FLOW CONTROL DEVICE".

SUMMARY OF THE INVENTION

The primary objective of the present invention is to provide a novel flow control device which shut off automatically after a desired quantity of water flowing therethrough.

In accordance with one aspect of the invention, there is provided a flow control device which includes a base having a water inlet and a water outlet, a partition plate separating the base into two chambers, an opening being formed in the partition plate, a ball slidingly received in one of the chambers and caused to seal the opening of the base by water flow through the water inlet, a housing received in the other chamber, two windows being formed in the housing and permitting passage of water through the housing to the water outlet, an impeller rotatably received in the housing and caused to rotate by the water flow through the housing, a casing disposed upon the housing, a cylinder being formed in the casing and being located above the ball, a plunger received in the cylinder and having a lower end contacting the ball, a spring biasing the plunger upward, a wheel rotatably supported on the cap, a gear frictionally engaged on an axle of the wheel and coupled to the impeller by a gear reduction train so that the wheel can be caused to rotate by the impeller, the upper end of the plunger being slidingly engaged with a cam portion formed in the lower surface of the wheel so that the plunger can be caused to move up and down, water may flow through the opening to propel the impeller when the ball is prevented from sealing the opening of the casing so that the wheel can be caused to rotate, and the upper end of the plunger riding up a ramp of the cam portion so that the ball can be caused to seal the opening of the base again.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
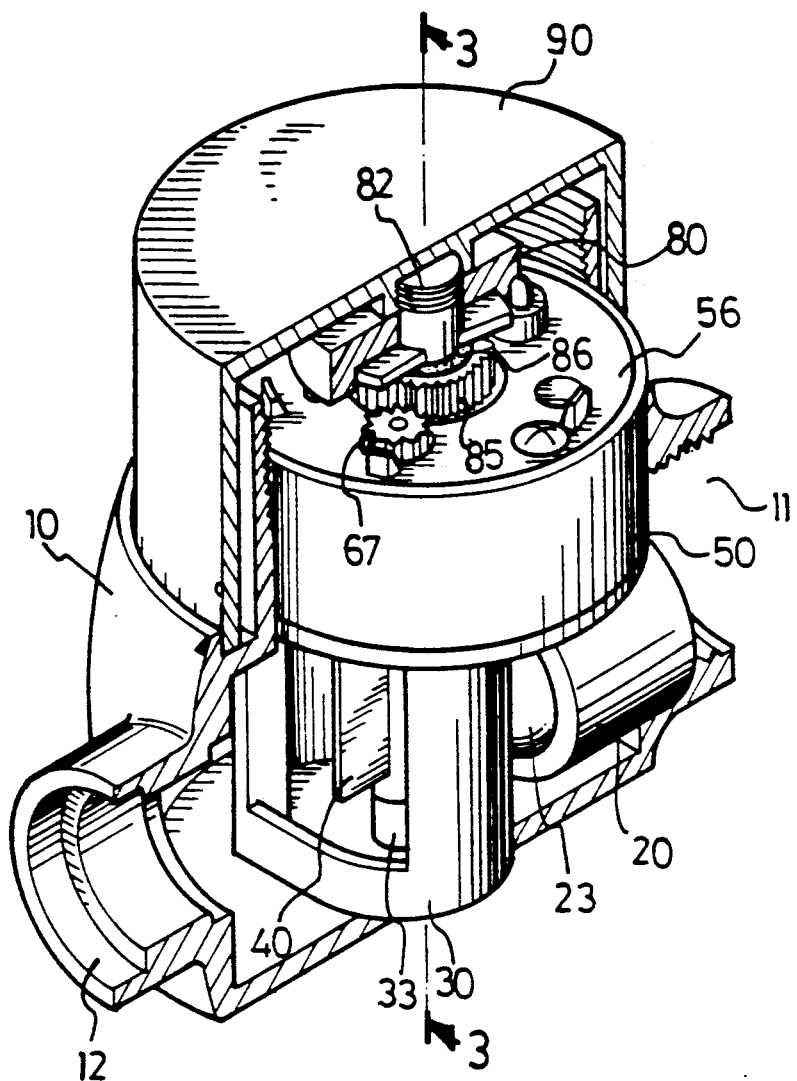
FIG. 1 is a perspective view of a flow control device in accordance with the present invention, in which part of the casing is cut off.
Figure 2:
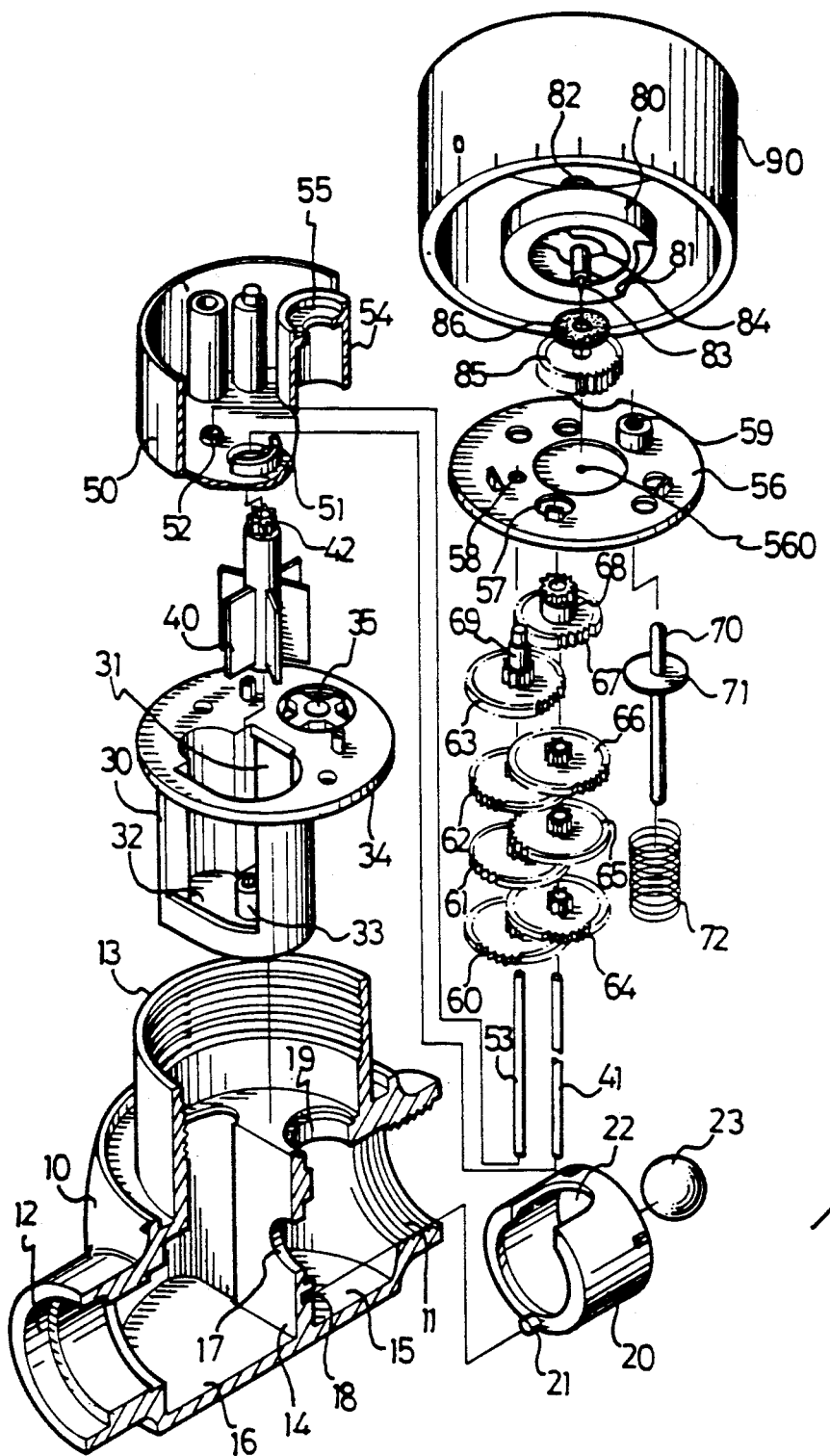
FIG. 2 is an exploded view of the device.

Referring to the drawings and initially to FIGS. 1 and 2, a flow control device in accordance with the present invention comprises generally a base 10 having a water inlet 11 and a water outlet 12, a cylindrical wall 13 formed on the upper portion of the base 10, and a knob 90 engaged on the cylindrical wall 13 of the base 10 for controlling water or liquid flow through the base 10.

Figure 3:
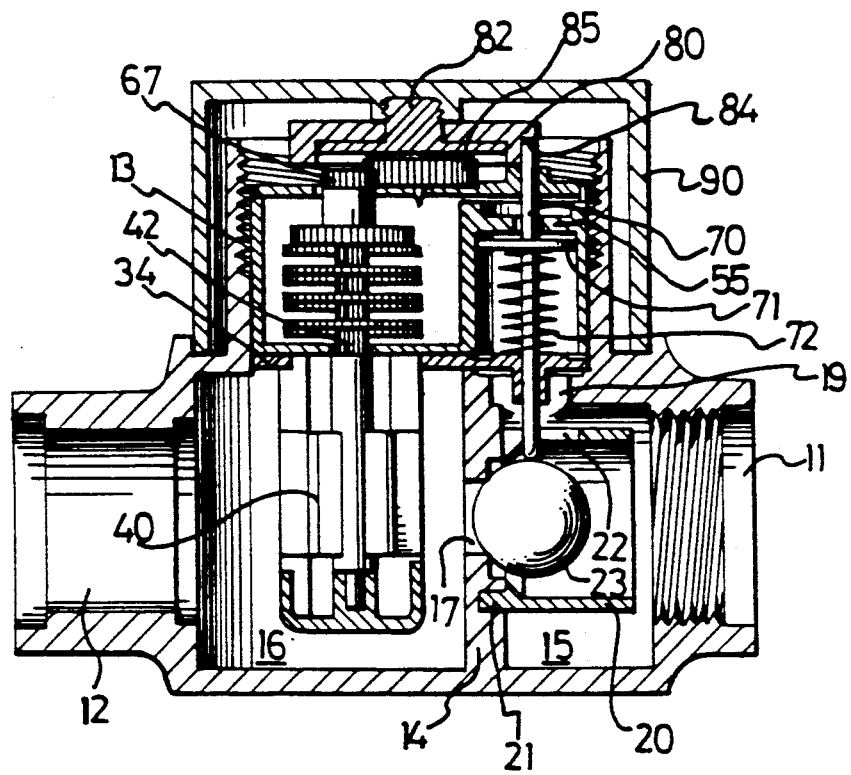
FIGS. 3 and 4 are cross sectional views taken along lines 3—3 of FIG. 1.

A partition plate 14 is formed in the middle portion of the base 10 and separates the interior of the base 10 into two chambers 15, 16, in which the first chamber 15 is located close to the water inlet 11 and the second chamber 16 is located close to the water outlet 12. An opening 17 is formed in the partition plate 14 and is communicated between the two chambers 15, 16. A depression 18 is formed in the partition plate 14 and faces toward the water inlet 11. A mouth 19 is formed in the upper portion of the chamber 15. A sleeve 20 is received in the first chamber 15 and has a stub 21 formed thereon. The sleeve 20 is supported against rotational movement relative to the base 10 by the stub 21 which is engaged in the depression 18 of the partition plate 14. A notch 22 is formed in the upper portion of the sleeve 20 and is in alignment with the mouth 19. A ball 23 is received in the sleeve 20. The movement of the ball 23 is limited by the sleeve 20. Water flow through the base 10 will seal ball 23 against the partition plate 14, as shown in FIG. 3, and prevent flow of water.

A housing 30 is received in the second chamber 16 and has two windows 31, 32 formed therein. An impeller shaft boss 33 is formed in the bottom of the housing 30, into which the lower end of the impeller shaft 41 is disposed. A lid 34 is integrally formed on the upper portion of the housing 30 and has an aperture 35 formed therein. An impeller 40 is received in the housing 30 and is rotatably fitted on the impeller shaft 41. An impeller pinion 42 is formed integral with the impeller 40. A casing 50 is disposed above the lid 34 of the housing 30 and has an access 51 formed in the bottom thereof. The impeller pinion 42 extends through the access 51 into the casing 50. A counter shaft boss 52 is formed on the bottom of the casing 50, into which the lower end of the counter shaft 53 is disposed. A cylindrical portion 54 is formed in the casing 50, and a ring portion 55 is integrally formed in the upper portion thereof. A cap 56 is engaged on the upper portion of the casing 50 and has an orifice 57 and two holes 58, 59 formed therein.

A first gear/pinion 60, second gear/pinion 61, third gear/pinion 62, fourth gear/pinion 63 are stacked on the counter shaft 53 such that they may each rotate freely about the counter shaft 53. A pin 69 is integrally formed on the upper end of the fourth gear/pinion 63 and is parallel to the center line of the fourth gear/pinion 63. The upper end of the pin 69 is rotatably engaged in the first hole 58 of the cap 56. The impeller pinion 42 is engaged to drive the first gear/pinion 60. A fifth gear/pinion 64, sixth gear/pinion 65, seventh gear/pinion 66 and eighth gear/pinion 67 are mounted on the impeller shaft 41 so that they may each rotate freely about the impeller shaft 41. The pinion portion of the first gear/pinion 60 engages the gear portion of the fifth gear/pinion 64. In like manner, the fifth gear/pinion 64 engages the second gear/pinion 61, which in turn engages the sixth gear/pinion 65, which in turn engages the third gear/pinion 62, which in turn engages the seventh gear/pinion 66, which in turn engages the fourth gear/pinion 63, which in turn engages the eighth gear/pinion 67. A neck portion 68 is formed in the middle portion of the eighth gear/pinion 67 and is rotatably engaged in the orifice 57 of the cap 56 so that the pinion of the eighth gear/pinion 67 extends above the cap 56.

Figure 4:
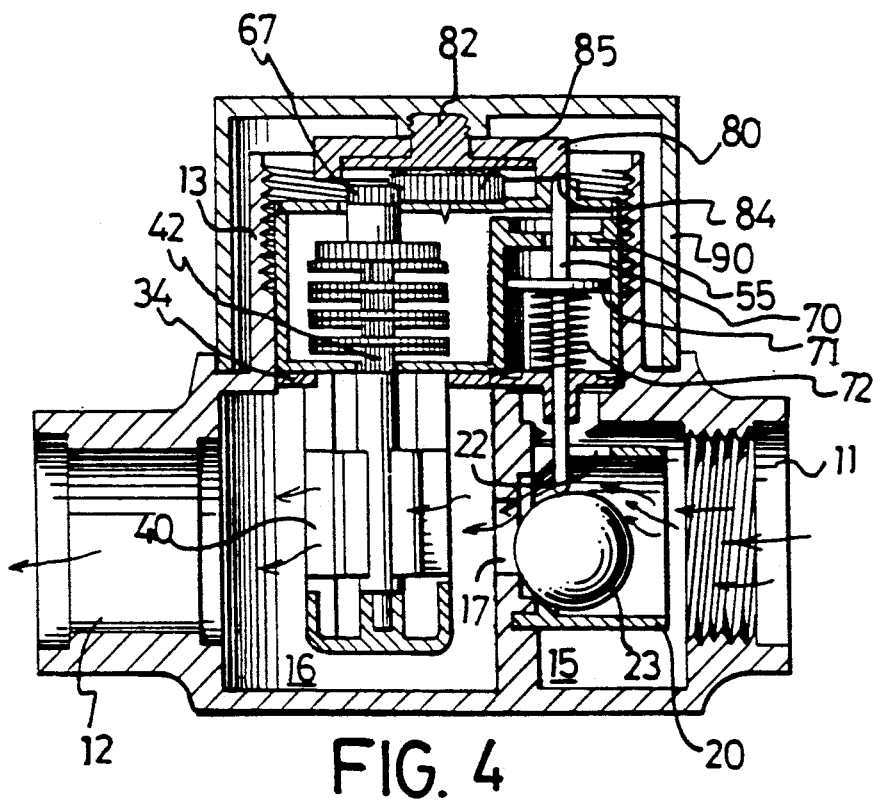
Figure 6:
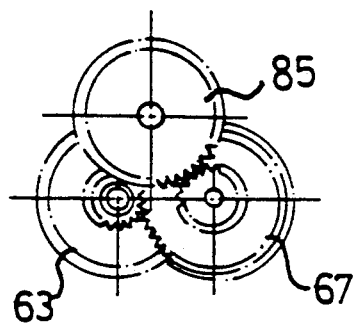
FIG. 6 is a top elevational view of the gearing and the impeller as shown in FIG. 5.
Figure 5:
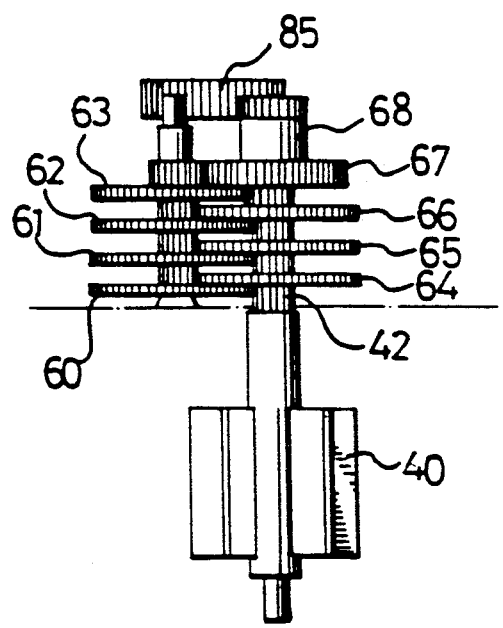
FIG. 5 is a plane view of the gearing and the impeller.

A plunger 70 is received in the cylindrical portion 54 of the casing 50 and has a disc 71 integrally formed therewith. A spring 72 is biased between the lid 34 and the disc 71 of the plunger 70 for biasing the plunger 70 upward. The lower end of the plunger 70 is slidingly engaged with the ball 23 with which the plunger 70 is in alignment (FIGS. 3 and 4). The upper end of the plunger 70 extends through the second hole 59 of the cap 56. A wheel 80 has an axle 81 formed on the bottom and has a bolt 82 formed on the top thereof. An extension 83 is formed on the lower end of the axle 81 and is rotatably received in the center hole 560 of the cap 56. A cam portion 84 is formed in the lower surface of the wheel 80. The bolt 82 is threadedly engaged to and rotated with the knob 90. A ninth gear 85 and a gasket 86 are frictionally engaged on the axle 81 of the wheel 80, the gasket 86 further provides friction between the wheel 80 and the ninth gear 85 so that the wheel 80 and the knob 90 can be caused to rotate in a first direction by the ninth gear 85. However, when the knob 90 is rotated in a second, i.e. the reverse direction against the frictional load between the wheel 80 and the ninth gear 85, the knob 90 and the wheel 80 are rotatable about the ninth gear 85. The pinion portion of the eighth gear/pinion 67 is engaged with the ninth gear 85 so that the knob 90 and the wheel 80 can be caused to rotate in the first direction. The upper end of the plunger 70 is slidingly engaged with the cam portion 84 of the wheel so that the plunger 70 can be caused to move downward in order to push the ball 23.

In operation, when the flow control device has not been activated, as shown in FIG. 3, the plunger 70 is biased upward by the spring 72 and permits free movement of the ball 23. Water flow through the water inlet 11 will seal the ball 23 against the opening 17 of the partition plate 14 and prevent further flow of water. When the knob is rotated in the second direction against the frictional load between the wheel 80 and the ninth gear 85, the plunger 70 is depressed downward by the cam portion 84 of the wheel 80 so that the ball 23 is prevented from seating against the opening 17 of the partition plate 14, which permits passage of water (FIG. 4).

When water flows into the second chamber 16 and flows out of the water outlet 12, the impeller 40 is propelled and caused to rotate by the water, the ninth gear 85 and the wheel 80 and the knob 90 can be caused to rotate in the first direction by the impeller 40 via the gear/pinions. The upper end of the plunger 70 rides up the ramp of the cam portion 84 of the wheel 80, when the wheel 80 rotates in the first direction, until the disc 71 contacts the ring portion 55, so that the opening 17 will be closed again by the ball 23 in a preselected time.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A flow control device comprising:
   a base having a water inlet and a water outlet, and having a knob provided on an upper portion thereof, a partition plate separating an interior of said base into two chambers which includes a first chamber close to said water inlet and a second chamber close to said water outlet, an opening being formed in said partition plate and communicated between said chambers;
   a ball slidingly received in said first chamber and caused to seal said opening of said base by water flow through said water inlet;
   a housing received in said second chamber, two windows being formed in said housing and permitting passage of water through said housing to said water outlet;
   an impeller rotatably received in said housing and caused to rotate by said water flow through said housing, an impeller pinion being formed integral with said impeller;
   a casing disposed upon said housing and having a cylindrical portion formed therein, said cylindrical portion being located above said first chamber, a cap disposed upon said casing;
   a gear reduction train received in said casing;
   a plunger received in said cylindrical portion of said casing, a lower end of said plunger slidingly contacting said ball, an upper end of said plunger extending upward beyond said cap of said casing, and a spring biasing said plunger upward; and
   a wheel having an axle rotatably supported on said cap, a gear being engaged on said axle of said wheel by a frictional force, said gear reduction train being engaged between said gear and said impeller pinion so that said wheel can be caused to rotate by said impeller, a cam portion being formed in a lower surface of said wheel, said upper end of said plunger being slidingly engaged with said cam portion of said wheel so that said plunger can be caused to move up and down, said knob being coupled to said wheel and rotating in concert with said wheel; and
   said ball being prevented from sealing said opening of said casing when said plunger is caused to move downward by engagement between said upper end of said plunger and said cam portion of said wheel, which permits passage of water through said opening into said housing in order to propel said impeller, said wheel being caused to rotate when said impeller is propelled, and said upper end of said plunger riding up a ramp of said cam portion so that said plunger can be biased upward by said spring and so that said ball can be caused to seal said opening of said base again.

2. A flow control device according to claim 1, wherein a depression is formed in said partition plate, a sleeve is received in said first chamber and has a stub formed thereon for engagement in said depression of said partition plate and has a notch formed in an upper portion thereof, said ball is received in said sleeve, said lower end of said plunger extends through said notch of said sleeve and contacts said ball.

3. A flow control device according to claim 1, wherein a lid is integrally formed on an upper portion of said housing and has an aperture formed therein, said lower end of said plunger extends downward through said aperture of said lid into said sleeve.

4. A flow control device according to claim 3, wherein a ring portion is formed in an upper portion of said cylindrical portion of said casing, a disc is formed integral with said plunger and is located below said ring portion of said cylindrical portion, said spring is biased between said disc of said plunger and said lid of said housing for biasing said plunger upward.

* * * * *